(12) United States Patent
Sugiyama et al.

(10) Patent No.: US 7,228,554 B2
(45) Date of Patent: Jun. 5, 2007

(54) CARTRIDGE TYPE RECORDING MEDIUM AND DISK-SHAPED RECORDING MEDIUM INCLUDING A HOLE FOR CENTERING EACH THEREOF, CARTRIDGE, DRIVING UNIT AND DRIVING METHOD

(75) Inventors: Toshinori Sugiyama, Tsukuba (JP); Kenjirou Kiyono, Tsukuba-gun (JP)

(73) Assignees: Hitachi Maxell, Ltd., Osaka (JP); Mitsubishi Kagaku Media Co., Ltd., Tokyo (JP)

( * ) Notice: Subject to any disclaimer, the term of this patent is extended or adjusted under 35 U.S.C. 154(b) by 0 days.

(21) Appl. No.: 11/407,114

(22) Filed: Apr. 20, 2006

(65) Prior Publication Data

US 2006/0195855 A1    Aug. 31, 2006

Related U.S. Application Data

(62) Division of application No. 10/367,736, filed on Feb. 19, 2003, now Pat. No. 7,073,186.

(30) Foreign Application Priority Data

Feb. 26, 2002 (JP) .............................. 2002-49985
Jan. 24, 2003 (JP) .............................. 2003-16309

(51) Int. Cl.
*G11B 17/028* (2006.01)
(52) U.S. Cl. .................................... 720/704
(58) Field of Classification Search ............... 720/704, 720/706; 360/133, 99.12
See application file for complete search history.

(56) References Cited

U.S. PATENT DOCUMENTS 4,649,531 A * 3/1987 Horowitz et al. .......... 720/704
4,694,448 A   9/1987 Tamaru et al.
5,025,340 A * 6/1991 Peters ...................... 360/99.12
5,090,010 A   2/1992 Takahashi
5,208,798 A * 5/1993 Funabashi et al. .......... 720/706
5,241,441 A   8/1993 Yamada et al.
5,315,470 A   5/1994 Fujino et al.
5,381,402 A * 1/1995 Lee et al. .................... 720/738

(Continued)

FOREIGN PATENT DOCUMENTS

JP    A 04-360056    12/1992

(Continued)

*Primary Examiner*—Angel Castro
(74) *Attorney, Agent, or Firm*—Oliff & Berridge, PLC

(57) ABSTRACT

The object of the present invention is to provide a technology which has high compatibility and can provide users with conveniences. A new system recording medium 100 has a center hole 112 formed on a recording disk 110 and a center hole 121 formed on a center hub 120, so that the recording medium 100 can respond to both an old system driving unit having a centering member coupling with the center hole 112 and a new system driving unit 300 having a second centering member 313 coupling with the center hole 121. Moreover, the old system recording medium is a recording medium providing a recording disk having a center hole incorporated in a cartridge having a center hub, and has a structure where the center hole is coupled both with a first centering member 312 of the new system driving unit 300 and with the centering member of the old system driving unit.

6 Claims, 13 Drawing Sheets

U.S. PATENT DOCUMENTS

| | | |
|---|---|---|
| 5,383,078 A | 1/1995 | Kato et al. |
| 5,579,297 A | 11/1996 | Childers et al. |
| 5,587,994 A | 12/1996 | Nagaura et al. |
| 5,610,902 A | 3/1997 | Childers et al. |
| 5,793,742 A | 8/1998 | Sandell et al. |
| 5,859,834 A * | 1/1999 | Takahashi et al. .......... 720/723 |
| 5,917,802 A * | 6/1999 | Konno ...................... 720/704 |
| 6,014,295 A | 1/2000 | Oishi |
| 6,038,206 A | 3/2000 | Mukawa |
| 6,061,215 A | 5/2000 | Tomita |
| 6,212,037 B1 | 4/2001 | Fukuda |
| 6,249,506 B1 * | 6/2001 | Oowaki et al. ............. 720/706 |
| 6,324,154 B1 | 11/2001 | Kakuta et al. |
| 6,704,275 B2 * | 3/2004 | Netsu et al. ................ 720/721 |
| 6,807,028 B1 | 10/2004 | Oishi |

FOREIGN PATENT DOCUMENTS

| | | |
|---|---|---|
| JP | A 06-150504 | 5/1994 |
| JP | 06318356 | * 11/1994 |
| JP | A 07-006467 | 1/1995 |
| JP | A 07-14274 | 1/1995 |
| JP | A 07-121960 | 5/1995 |
| JP | A 08-235712 | 9/1996 |
| JP | A 09-265705 | 10/1997 |
| JP | A 11-045485 | 2/1999 |
| JP | A 11-185425 | 7/1999 |

* cited by examiner

CARTRIDGE TYPE RECORDING MEDIUM AND DISK-SHAPED RECORDING MEDIUM INCLUDING A HOLE FOR CENTERING EACH THEREOF, CARTRIDGE, DRIVING UNIT AND DRIVING METHOD

This is a Divisional of application Ser. No. 10/367,736, filed Feb. 19, 2003 now U.S. Pat. No. 7,073,186. The entire disclosure of the prior application is hereby incorporated by reference herein in its entirety.

BACKGROUND OF THE INVENTION

1. Field of the Invention

The present invention relates to a cartridge type recording medium incorporating a recording disk in its cartridge, a driving unit performing recording and/or reproducing to the cartridge type recording medium, and the like.

2. Description of the Related Art

Along with the popularization of digital content, disk-shaped recording media such as CDs (compact disks) and DVDs (Digital Versatile Disks) has been widely used as media for housing the digital content in recent years. When a driving unit such as a recording and/or reproducing unit is equipped with such a recording medium, a convex fitting portion formed in the driving unit is coupled into a center hole having a diameter of approximately 15 mm, which is bored at the center portion of the recording medium. Thus, centering (positioning) of the recording medium with respect to the driving unit is executed.

Incidentally, as to the conventional recording medium, a plastic substrate having relatively small rigidity and moreover having a large coefficient of thermal expansion is used, and a hole of a relatively large diameter of 15 mm is formed in the substrate. Therefore, it is difficult to thoroughly position the recording medium relative to the fitting portion of the driving unit when a simple coupling is employed. This is because, in order to position the recording medium relative to the fitting portion thereof with the simple coupling, especially the center hole of the recording medium is required to have high dimensional precision, rigidity and the like for preventing deformation due to contact with the fitting portion of the driving unit and deformation due to temperature change.

Accordingly, it is generally adopted that the conventional recording medium generally comprises a centering member 12 onto the fitting portion 11 of the driving unit 10. The centering member 12 has a tapered shape having an outer diameter that gradually becomes smaller toward the tip end portion thereof, as shown in FIG. 12. When the recording medium 20 is loaded to the driving unit 10 having such fitting portion 11, it is possible that an error and the like in a diameter of the center hole 22 formed in a disk substrate 21 of the recording medium 20 is absorbed and positioning precision is enhanced because of the tapered shape of the centering member 12. Furthermore, the coupling of the recording medium 20 to the fitting portion 11 can be easily executed.

However, in such method, it has been difficult to accurately position the centering member 12 to the fitting portion 11 of the driving unit 10 when flashes, dirt and the like exist on an edge portion 22a of the center hole 22.

Incidentally, it is drastic that these recording media have been improving in higher recording density in recent years. Along with the above, a pitch of tracks in which data is recorded (hereinafter, referred to as a track pitch) tends to become narrower. When the track pitch becomes narrower as written above, positioning of the recording medium to the driving unit is required to be more precise than ever in order to surely record/reproduce data by a pickup of the driving unit.

For example, HD-DVD and the like that are next generation optical recording media of the same size as CD having recording capacity exceeding 20 GB have track pitches of approximately 0.3 µm, and therefore, the positioning precision in eccentricity of the recording medium relative to the driving unit must be 15 µm or less.

However, it is actually obliged to say that positioning of the recording medium 20 to the driving unit 10 is practically impossible with required precision due to the foregoing reasons in the system shown in FIG. 12 to meet such requirements.

Therefore, in the recording medium 30 such as a magneto-optical disk regulated in the ISO (International Organization for Standardization), a structure in which a center hub 34 having a hole 33 of a diameter smaller than that of a center hole 32 formed in a disk substrate 31 is combined in one united body to the disk substrate 31 is adopted as shown in FIG. 13. In this structure, a centering shaft 42 provided in a fitting portion 41 of the driving unit 40 is coupled into the small diameter hole 33, and thus positioning of the recording medium 30 to the driving unit 40 is executed.

With such structure, a material having rigidity higher than that of the disk substrate 31 and a coefficient of thermal expansion smaller than that of the disk substrate 31 is adopted for the center hub 34, and the hole 33 smaller than the center hole 32 is formed. Thus, dimensional precision and dimensional stability of the hole 33 itself can be further enhanced than those of the center hole 32, accordingly it is possible to secure high positioning precision of the recording medium 30 to the driving unit 40.

As described above, from the viewpoint that merely high positioning precision is merely secured, a system in which the center hub 34 having the small diameter hole 33 formed therein as shown in FIG. 13 is preferably adopted for the recording medium spread in the market is in the year to come.

However, recording mediums such as CDs and DVDs have already spread among users in the present. Existing CDs and DVDs adopt a constitution in which positioning is executed by use of the center hole 22 having a diameter of 15 mm, which is formed in the disk substrate 21 (hereinafter, referred to as an old system as the need arises), as shown in FIG. 12.

To the contrary, if a constitution (hereinafter, referred to as a new system as the need arises) in which positioning is executed by use of the small diameter hole 33 formed on the center hub 34 is adopted for the recording medium that will spread from now on, as shown in FIG. 13, compatibility between the old and the new systems is lost, and users have to prepare the old system driving unit 10 for the old system recording medium 20 and the new system driving unit 40 for the new system recording medium 30. Accordingly, it cannot be said that convenience for the users is high with this.

SUMMARY OF THE INVENTION

The present invention has been made in consideration for the foregoing points of view, therefore an object of the present invention is to provide a technology having high compatibility and capability of enhancing convenience for the users.

Aiming at the foregoing object, the driving unit of the present invention comprises, on a disk holding portion thereof for holding a recording disk, a first centering member having a predetermined outer diameter; a second centering member having an outer diameter smaller than that of the first centering member; and a protrusion size changing mechanism which changes a size of a portion of the second centering member protruding with regard to the first centering member toward the recording disk. Herein, though the protrusion size changing mechanism can allow the portion of the second centering member to proceed relative to the first centering member, thus changing the size of the portion of the second centering member which protrudes from the second centering member, the protrusion size changing mechanism preferably adopts a constitution which can retreat the first centering member relative to the second centering member and has an elastic member to return the first centering member to the original position thereof.

The cartridge type recording medium according to the present invention is characterized by comprising a recording disk in which a first hole for centering is formed at the center portion thereof, a cartridge for housing the recording disk, and a hub provided integrally with the recording disk, wherein the hub has a second hole for centering the recording disk which has a diameter smaller than that of the first hole and formed at a center portion of the hub.

With such a constitution, the recording disk can be centered by use of any of the first and the second holes.

To be more specific, when such cartridge type recording medium is made to respond to the above described disk unit, the recording disk is centered at the disk holding portion of the disk unit by coupling the second centering member into the second hole (centering hole).

Furthermore, when such cartridge type recording medium is made to correspond to the conventional driving unit, for example, as shown in FIG. 12, the recording disk is centered at the first hole with the centering member of the driving unit coupled therewith.

Of the cartridge type recording media as described above, only the recording disk and the hub, excluding the cartridge, can also configure the disk-shaped recording medium.

More specifically, the disk-shaped recording medium according to the present invention comprises the recording disk at the center portion of which the first hole is formed and the hub which has the second hole having smaller diameter than the first hole and which is fixed onto one side of the recording disk. Here, the hub is, with respect to the recording disk, preferably placed on a surface opposite to a surface facing to a fixing member being inserted into the first hole or the second hole in order for the recording disk to be fixed to a driving unit.

Moreover, the aforementioned recording disk and the hub are able to be contained inside the cartridge shaping a box having a shutter which can be opened/closed. Due to the containing of the recording disk and the hub inside the cartridge, it is possible to realize the similar structure to the above mentioned cartridge type recording medium.

The present invention can also be considered as a cartridge type recording medium which is characterized by comprising the recording disk at the center portion of which the hole is formed, the cartridge which contains the recording disk and which has the shutter capable of be opened/closed, and the hub which is held in the cartridge in the state where the hub is movable in the direction of the diameter of the recording disk and which has the hole having a smaller diameter than that of the hole formed at the center portion. When the recording disk having the hole at the center portion thereof, specifically, a recording disk such as conventional CD and DVD is contained in the cartridge, the above mentioned cartridge type recording medium can be configured.

Meanwhile, first and foremost, it is critical that the cartridge holds the hub having the hole smaller in the diameter than that of the hole of the recording disk to be able to move in the diameter direction of the recording disk.

In the case of the above mentioned cartridge type recording medium, the centering of the recording disk is executed by use of the hole of the recording disk as the similar way as before. Also in a case that the first centering member and the second centering member having a smaller diameter than that of the first centering member as the driving unit mentioned above, the first centering member is to be inserted into the hole of the recording disk in order to execute the centering of the recording disk. Though at this event the second centering member is inserted into the hole of the hub, there is no effect with the centering of the recording disk, because the hub is movable in the direction of the diameter thereof.

When the present invention is considered as a single piece of the cartridge for containing the recording disk such as CD and DVD, the cartridge is characterized by comprising the box-shaped cartridge body, the hub having the hole smaller than the central hole on the recording disk and a hub holding portion which is provided in the cartridge body and holds the hub in the state where the hub is movable in the diameter direction of the hole.

In this occasion, the hub holding portion can also hold the hub in the state where the hub is movable in the direction approximately orthogonal to the surface of the recording disk to be contained in the cartridge.

When the central hole having the predetermined diameter and the recording disk having the hub provided so as to move against the recording disk which are mentioned above, are made to respond to the above mentioned driving unit, the recording disk is centered at the disk holding portion of the driving unit by means of the coupling of the first centering member into the central hole.

Meanwhile, it can also be considered that the present invention is the driving unit executing recording/reproducing on the cartridge type recording medium in which both the recording disk having the central hole formed thereon and the hub having the hole smaller than the central hole formed thereon are contained. The driving unit is characterized by comprising the centering member for centering the recording disk by means of mutual coupling with the central hole of the recording disk and a table member having a table surface against which a surface of the recording disk abuts. In other words, although the small diameter hole is formed on the hub, centering is not executed by use of this, but centering is executed by use of the central hole of the recording disk.

Furthermore, the driving method in the present invention is characterized by Comprising the driving method for a first recording medium and a second medium. Here, the first recording medium is composed from the cartridge containing the recording disk having the central hole and the hub which is integrated with the recording disk in one united body and which has the hole of a diameter smaller than the central hole. The second recording medium is composed from the cartridge containing the recording disk having the central hole and the hub which is a separated body from the recording disk and which has the hole of a diameter smaller than the central hole. When driving the first recording medium with the driving unit providing two large and small centering members, the positioning of the recording disk is executed by coupling of the smaller centering member into the small diameter hole. When driving the second recording medium with the driving unit providing two large and small centering members, the positioning of the recording disk is executed by coupling of the larger centering member into the central hole. When driving the first or the second recording medium with the driving unit providing only one centering member, the positioning of the recording disk is executed by coupling of only one centering member into the central hole.

In other words, the first recording medium executes centering by use of the hub in the case of the driving unit providing two large and small centering members, and executes centering by use of the recording disk in the case of the driving unit providing only one centering member. On the other hand, the second recording medium executes centering by use of the recording disk with either driving unit, that is, the driving unit providing two large and small centering members or the driving unit providing only one centering member.

Thus, so-called compatibility can be attained among the first recording medium, the second recording medium, the driving unit providing two large and small centering members and the driving unit providing only one centering member.

Meanwhile, the present invention is characterized by the cartridge type recording medium which is capable of recording and/or reproducing by use of a first driving unit containing a centering member and a second driving unit containing a centering member. Also the cartridge type recording medium includes members written below. These are the recording disk in which a first hole is provided for centering thereof to the first driving unit with the centering member of the first driving unit abutting to the center portion of the recording disk, the cartridge housing the recording disk and including a shutter capable of opening/closing, and the hub which is held by the cartridge in a movable state in a direction of a diameter of the recording disk, constituted to be smaller in size than the first hole, capable for the centering member of the second driving unit to be inserted into, and a second hole provided in the center portion for centering thereof to the second driving unit.

Additionally, the disk shaped recording medium of the present invention is applied to include the hub which has the second hole as described below. The hole of a diameter smaller than the first hole is integrally and concentrically configured together with the recording disk, capable for the centering member of the second driving unit to be inserted, and provided in the center portion for the centering thereof to the second driving unit.

When looked at from another view point, the present invention related to the driving unit capable of recording and/or reproducing with regard to the first recording disk having the hole for centering and the second recording disk having the hole for centering. The above driving unit includes the first centering member having a predetermined outer diameter and centering the first recording disk to the disk holding portion that holds the first recording disk and the second recording disk, the second centering member which is smaller in the outer diameter than the first centering member and for the centering of the second recording disk to the disk holding member, and a protrusion size changing mechanism for changing a protrusion size of the second centering member against the first centering member toward the recording disk.

Moreover, the present invention is a driving method with regard to the first recording disk and the second recording disk by use of the driving unit constituting the first centering member and the second centering member smaller than the first centering member, and the driving method is characterized as written below. That is, positioning is executed using the first centering member when driving the first recording disk and another positioning is executed using the second centering member when driving the second recording disk.

As described above, according to the present invention, high compatibility is provided to increase convenience for the user.

DESCRIPTION OF THE PREFERRED EMBODIMENTS

The present invention will be described in detail below with reference to embodiments shown in the accompanying drawings.

Here, in the following description, a recording medium using a hole having a small diameter for positioning refers to as a new type recording medium and a recording medium using a center hole formed in a disk substrate for positioning refers to as an old type recording medium.

Firstly, the description will be given with regard to the respective configurations of the new type and old type recording media.

Figure 1:
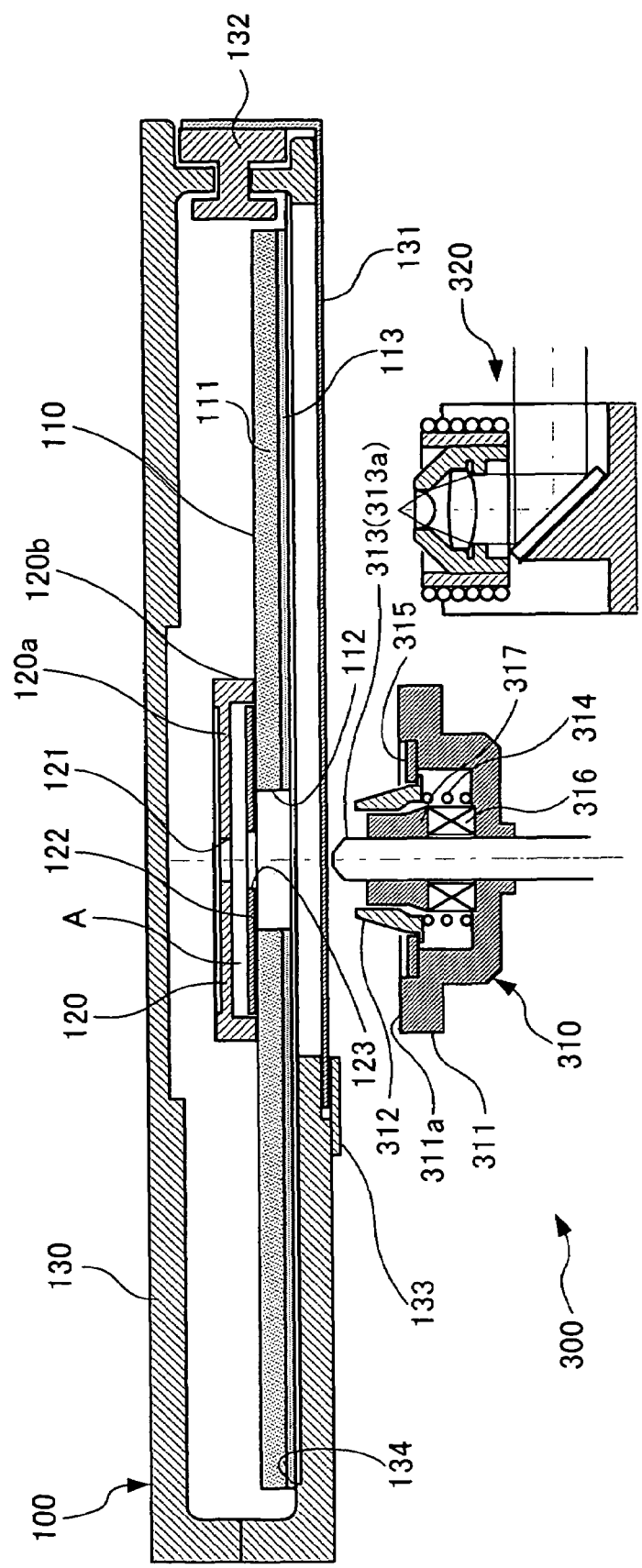
FIG. 1 is a sectional view showing a state before a recording medium is loaded on a driving unit in a combination of the recording medium of a new system and the driving unit of a new system according to an embodiment of the present invention.

FIG. 1 shows the configuration of a new type recording medium (a cartridge type recording medium, the first recording medium) 100 according to the embodiment.

As shown in FIG. 1, the new type recording medium 100 comprises a center hub (a hub) 120 provided integrally with a recording disk 110 and contained inside the cartridge 130.

The recording disk 110 has the center hole (the first hole) 112 having a diameter of approximately 15 mm formed at the center portion of a disk substrate 111 made of a plastic-based material, and a recording layer 113 on which data is to be recorded and a protective layer (not shown) and the like, which are provided on one surface of the recording disk 110.

The center hub 120 is approximately circular, is provided integrally on the other surface of the recording disk 110, that is, on the side opposite to the recording layer 113, and has the center hole (the second hole) 121 having a diameter at a level of 2 to 6 mm formed at the center portion thereof. Moreover, the center hub 120 has a structure of a disk portion 120a having the center hole 121 formed therein, and a peripheral wall portion 120b extending from an outer peripheral portion of the disk portion 120a toward the recording disk 110 by a predetermined distance. Thus, a space A having a predetermined clearance is provided between the disk portion 120a and the wall portion 120b of the center hub 120 and the other surface of the disk substrate 111. Inside the space A, a disk-shaped magnetic plate 122 is contained in a state where the magnetic plate 122 is movable in the direction of thickness of the recording disk 110. More specifically, the magnetic plate 122 has a loosely coupling structure against the recording disk 110 and the center hub 120. The magnetic plate 122 has a through hole 123 the diameter of which is smaller than that of the center hole 112 of the recording disk 110 and is larger than that of the center hole 121 of the center hub 120.

A cartridge 130 containing the recording disk 110 provided integrally with the center hub 120 has a shape of a thin box and has a structure in which a shutter 131 provided on one surface of the cartridge 130 opens/closes. The shutter 131 is substantially L-shaped in cross-sectional view, and the base slide portion thereof is provided integrally with a slide member 132 provided on one end of the cartridge 130, so that the shutter 131 can slide in the direction orthogonal to a surface of the drawing of FIG. 1.

Moreover, the tip end portion of the shutter 131 is constituted by a pressing member 133 being integral with the cartridge 130 so as to prevent 131 from floating over the cartridge 130.

A step portion 134 is formed on an inner peripheral surface of the cartridge 130, and the step portion 134 allows only an outer peripheral portion of the recording disk 110 to be in contact with the inner peripheral surface of the cartridge 130 and prevents the cartridge 130 from contacting with the range of the recording layer 113 of the inner peripheral surface in which data is to be recorded/reproduced.

The recording disk 110 is housed in the above-mentioned cartridge 130 in a state where the surface of the recording layer 113 faces the shutter 131. More specifically, the surface of the recording layer 113 of the recording disk 110 is exposed when the shutter 131 is opened.

The old type responding recording medium (a cartridge type recording medium, the second recording medium) 200 shown in FIG. 2 comprises a recording disk 210 contained in a cartridge (a cartridge body) 220, and can be respond to the new type driving unit to be described later in detail.

Figure 2:
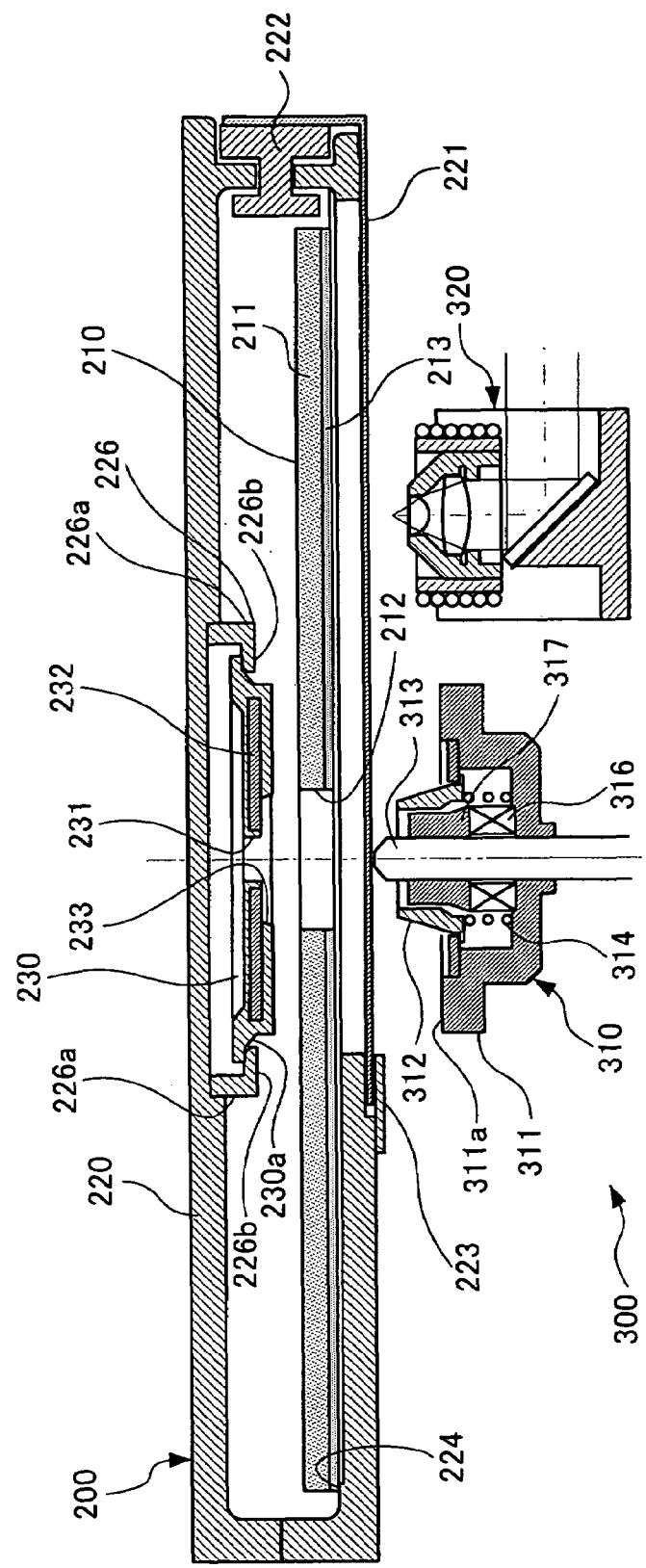
FIG. 2 is a sectional view showing a state before a recording medium is loaded on a driving unit in a combination of the recording medium of an old system and the driving unit of a new system.
Figure 12:
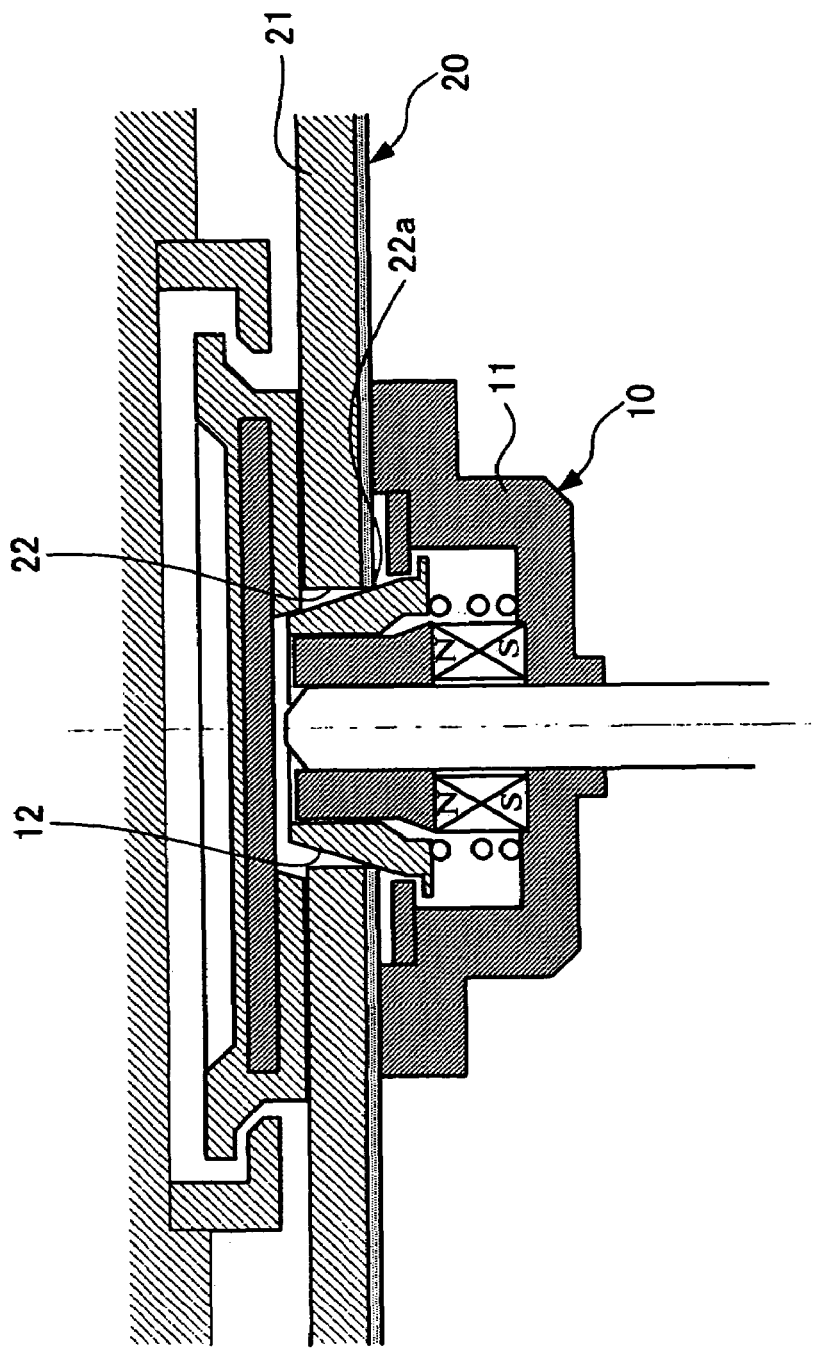
FIG. 12 is a sectional view showing a state where a conventional recording medium is loaded on a driving unit.
Figure 13:
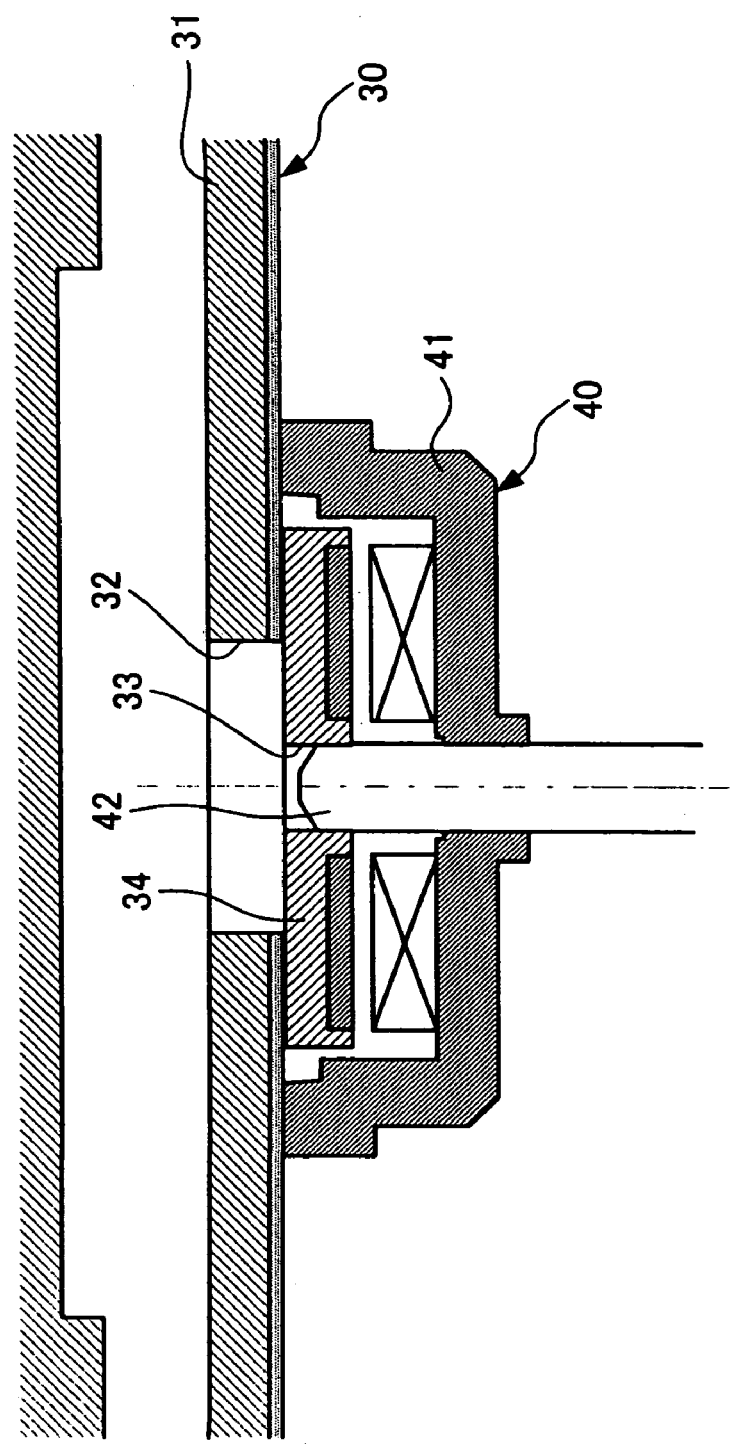
FIG. 13 is a sectional view showing a structure of centering a recording medium of the ISO standard with respect to a driving unit.

As shown in FIG. 2, the old type responding (hereinafter, referred to merely as the old type) recording medium 200 has a recording layer 213 on one surface of a disk substrate 211 in the same manner as a disk-shaped recording medium 20 such as a CD or a DVD as shown in FIG. 12, and has the recording disk 210 having the center hole (a hole) 212 having a diameter of 15 mm at the center portion thereof, which is contained in the cartridge 220.

The cartridge 220 housing the above-mentioned recording disk 210 has a shutter 221 on one surface which is opened/closed by sliding of a slide member 222 in the same manner as the cartridge 130 shown in FIG. 1. The shutter 221 also has a structure having a pressing member 223 so as to prevent the end of the shutter 221 from floating.

The step portion 224 is formed on the inner peripheral surface of the cartridge 220, and the step portion 224 allows only an outer peripheral portion of the recording disk 210 to be in contact with the inner peripheral surface of the cartridge 220 so as to prevent a range of the inner peripheral surface on which data is to be recorded/reproduced to the recording layer 213 from being contacted with the cartridge 220.

The cartridge 220 is provided with a center hub (a hub) 230, which is located on one surface of the inner peripheral surface facing a space containing the recording disk 210.

The center hub 230 has an outer shape of approximately a circle and has the center hole (a hole having a small diameter) 231 having a diameter in a level of 2 to 6 mm at its center portion. The center hub 230 has a tapered portion 230a the outer size of which gradually increases from the surface facing to the recording disk 210 toward the opposite side thereof. Moreover, the center hub 230 contains a disk-shaped built-in magnetic plate 232. Additionally, a relief recess portion 233 having approximately the same diameter as a center hole 212 formed in the recording disk 210 is formed at the center hub 230.

On the other hand, in order to hold the center hub 230, in the cartridge 220 side, a hub holding portion 226 constituted of a peripheral wall portion 226a rising by a predetermined size from one inner peripheral surface toward a side in which the shutter 221 is formed, and a support portion 226b extended from the peripheral wall portion 226a toward the inside is formed. An inner diameter of the support portion 226b is set smaller than a maximum diameter portion of the tapered portion 230a of the center hub 230, and larger than a minimum diameter portion.

Accordingly, while the tapered portion 230a is supported on the support portion 260b, the center hub 230 can freely move in a height range of the peripheral wall portion 226a in the rising direction of the peripheral wall portion 226a, i.e., in a thickness direction of the recording disk 210. Additionally, since the minimum diameter portion is larger than an inner diameter of the support portion 226b, the center hub 230 can move in a diameter direction with respect to the hub holding portion 226. That is, this center hub 230 also has a loosely coupling structure.

Next, constitutions of the driving unit sides of the new and old systems will be described. Note that in the description below, irrespective of the driving unit of the new or old system, as to constitutions of those other than the disk holding portion and the pickup, explanations will be omitted.

By referring to FIGS. 1 and 3, the driving unit 300 of the new system will be described.

As shown in FIG. 1, the driving unit 300 of the new system has two large and small centering members, and constituted of a disk holding portion 310, and a recording/reproducing pickup 320 provided in the vicinity thereof.

Figure 3:
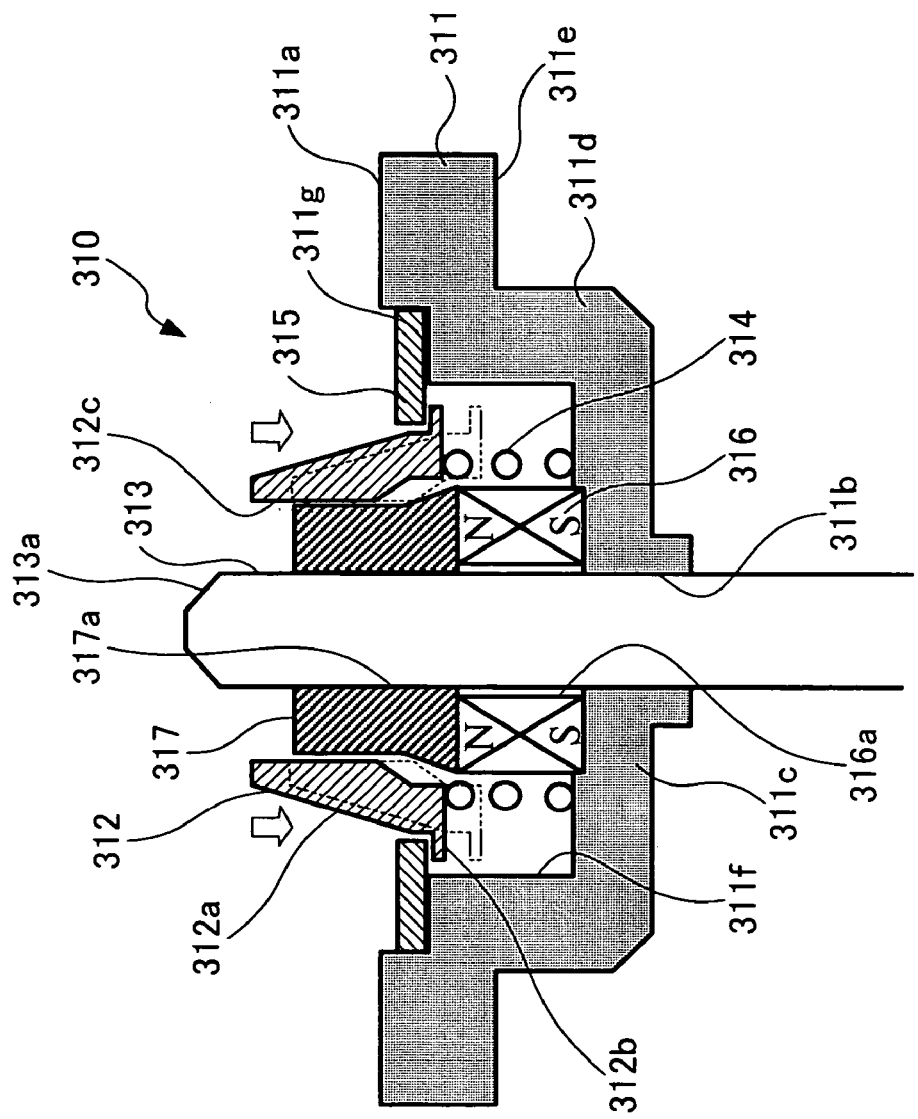
FIG. 3 is a sectional view showing a constitution of a disk holding portion in the driving unit of the new system.

As shown in FIG. 3, the disk holding portion 310 has a spindle table 311 having a table surface 311a abutted on a recording medium, a first centering member (fixing member) 312 for fixing the recording disk (see FIG. 2) of the old system, a second centering member (fixing member) 313 for fixing the recording disk 110 of the new system, an elastic member (protrusion size changing mechanism) 314 such as a coil spring for pressing the first centering member 312 in a direction of protrusion from the spindle table 311, a stopper 315 for regulating a moving range of the first centering member 312 by the pressing of the elastic member 314, a magnet 316, and a yoke 317.

The spindle table 311 is constituted of a bottom plate portion 311c having a through-hole 311b penetrated by the second centering member 313, a peripheral wall portion 311d rising from the outer peripheral side of the bottom plate portion 311c, and a table portion 311e extended from the peripheral wall portion 311d to the outer peripheral side and having a table surface 311a formed. Accordingly, the spindle table 311 has a constitution where a recess portion 311f is formed to receive the first centering member 312, the elastic member 314, the magnet 316, the yoke 317 and the like.

The first centering member 312 has a circular outer shape, and its outer peripheral surface 312a has a tapered shape in which an outer diameter is gradually reduced toward the tip end portion. On the base end side of this first centering member 312, a bulging portion 312b bulged to the outer peripheral side is formed. Additionally, the first centering member 312 has a through-hole 312c formed to sufficiently receive the yoke 317.

The elastic member 314 is fixed in a compressed state between the base end portion of the first centering member 312 and the bottom plate 311c of the spindle table 311. Thus, a constitution is provided to press the first centering member 312 in the direction of protrusion from the spindle table 311.

Additionally, the in the table portion 311e of the spindle table 311, a step portion 311g is formed in one-stage lower than the table surface 311a, and a ring-shaped stopper 315 is fixed to this step portion 311g. The stopper 315 interferes with the bulging portion 312b bulged to the outer peripheral side of the first centering member 312 to regulate the movement of the first centering member 312.

The magnet 316 is integrally fixed to the bottom plate portion 311c of the spindle table 311, and positioned inside the elastic member 314.

The yoke 317 is provided integrally with the magnet 316, and positioned inside the through-hole 312c of the first centering member 312.

Here, the yoke 317 and the spindle table 311 are made of metal-based material or the like, i.e., material to be magnetized in a magnetic field of the magnet 316.

The second centering member 313 is, for example, preferably formed integrally with a motor shaft of a spindle motor (not shown) for rotary-driving the recording disks 110, 210. The second centering member 313 is an approximately cylindrical shaft having a predetermined outer diameter, which is constituted in a manner that the through-hole 311b of the spindle table 311 and through-holes 316a, 317a formed in the magnet 316 and the yoke 317 are penetrated, and its tip end portion 313a protrudes more than the tip end portions of the yoke 317 and the first centering member 312. The tip end portion 313a of the second centering member 313 has a tapered shape in which the outer diameter is gradually reduced toward the top.

In such a disk holding portion 310, when the first centering member 312 is pushed in an arrow direction of FIG. 3, the elastic member 314 is compressed to be deformed, whereby the first centering member 312 is retreated relative to the second centering member 313. Accordingly, a constitution is provided where a protrusion size of the second centering member 313 with respect to the first centering member 312 is changed. Additionally, when the pressing of the first centering member 312 is released, a biasing force of the elastic member 314 makes the first centering member 312 advance until the bulging portion 312b comes into contact with the stopper 315, and thereby the first centering member 312 returns to the original position thereof.

Figure 4:
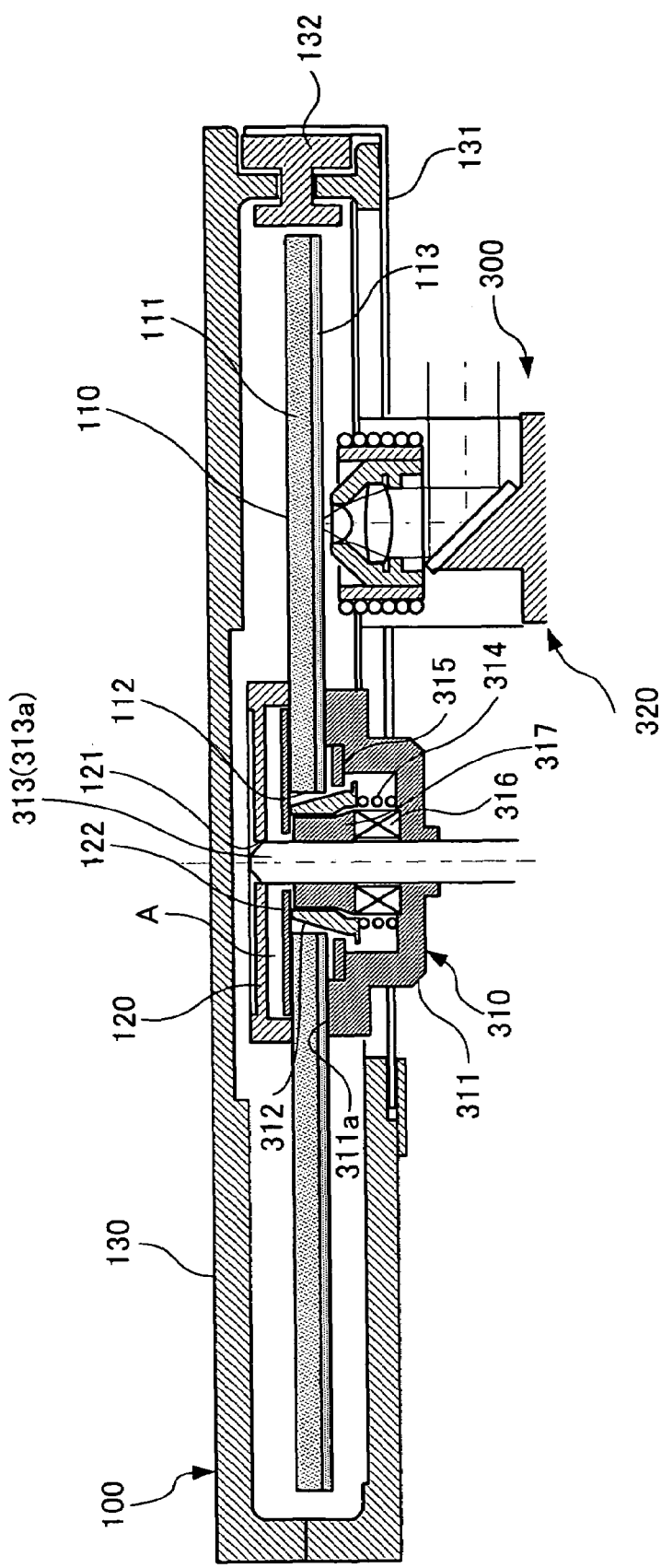
FIG. 4 is a sectional view showing a state where the recording medium of the new system is loaded on the driving unit of the new system.
Figure 5:
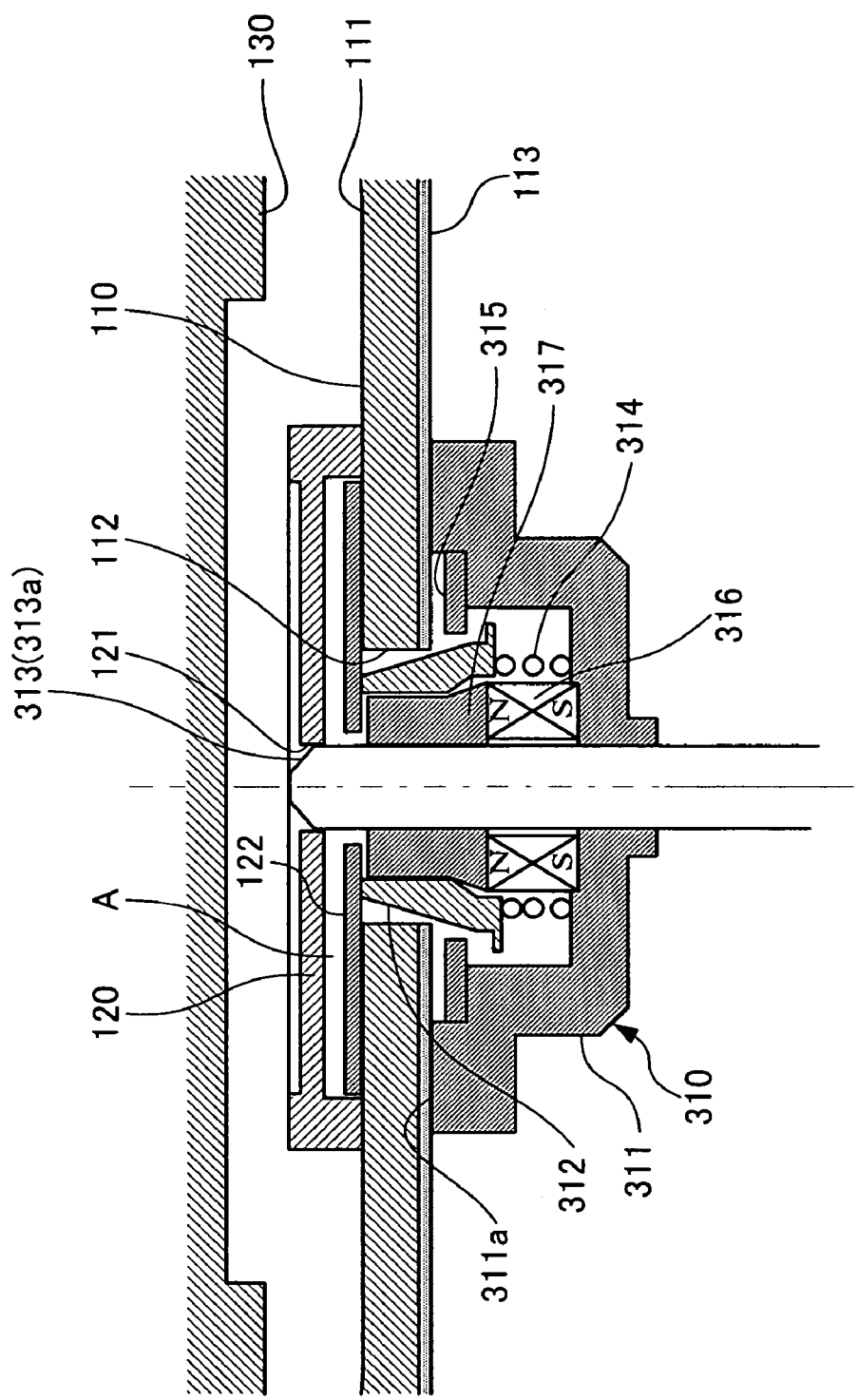
FIG. 5 is an enlarged view of main portions of FIG. 4.

FIGS. 1, 4 and 5 show a constitution when the recording medium 100 of the new system is combined with the aforementioned driving unit 300 of the new system.

From a state where the disk holding portion 310 of the driving unit 300 of the new system is placed oppositely to the recording medium 100 of the new system as shown in FIG. 1, the shutter 131 of the cartridge 130 of the recording medium 100 of the new system is opened to advance the disk holding portion 310 and the pickup 320 to the recording disk 110 as shown in FIG. 4.

Then, as shown in FIGS. 4 and 5, the table surface 311a of the spindle table 311 is abutted onto the recording layer 113 side of the recording disk 110 and, in this state, the tip end portion 313a of the second centering member 313 is inserted into the center hole 121 of the center hub 120 disposed integrally with the recording disk 110, whereby the recording disk 110 is positioned with respect to the disk holding portion 310, i.e., the driving unit 300 of the new system. That is, in the recording medium 100 of the new system, the centering of the recording disk 110 with respect to the driving unit 300 of the new system is executed by the center hub 120.

At this time, the magnetic plate 122 is adsorbed on the yoke 317 and the spindle table 311 magnetized by the magnet 316 of the disk holding portion 310, and moved to the recording disk 110 side in a space A of the center hub 120 to press the recording disk 110 to the spindle table 311, and tightly hold it.

Additionally, the first centering member 312 is inserted inside the center hole 112 formed in the recording disk 110. However, it is abutted on the magnetic plate 122 to retreat, and functions to make the second centering member 313 relatively protrude. Also, in the state of being inserted inside the center hole 112, the first centering member 312 retreats, besides, the outer peripheral surface 312a thereof is tapered in shape. Thus, no interference occurs with the center hole 112.

In the driving unit 300 of the new system, the recording disk 110 of the recording medium 100 of the new system is driven by the spindle motor (not shown) in the state of being positioned in the aforementioned manner, whereby recording/reproducing is executed to the recording layer 113 by the pickup 320.

Figure 6:
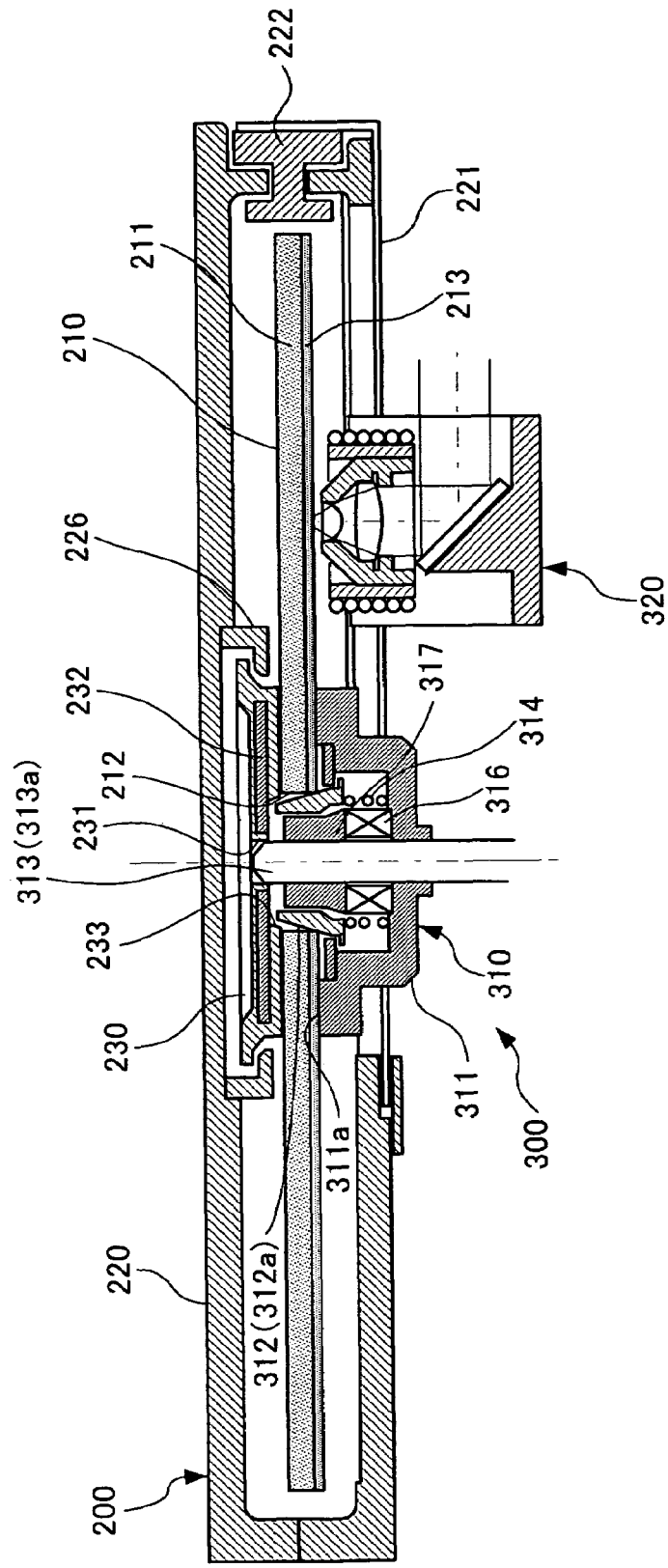
FIG. 6 is a sectional view showing a state where the recording medium of the old system is loaded on the driving unit of the new system.
Figure 7:
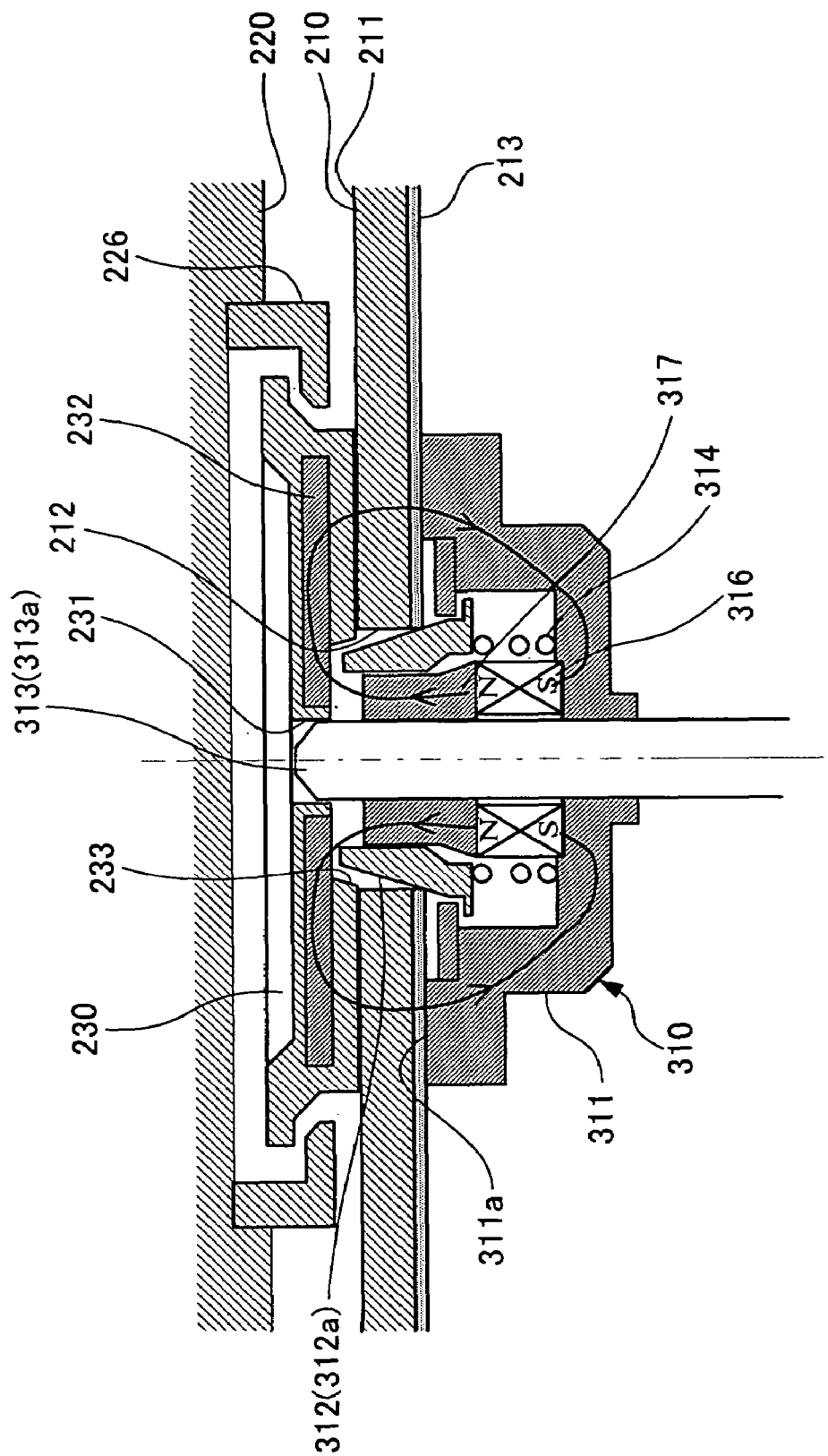
FIG. 7 is an enlarged view of main sections of FIG. 6.

FIGS. 2, 6 and 7 show an example where the driving unit 300 of the new system is set corresponding to a recording medium 20 of an old system.

From a state where the disk holding portion 310 of the driving unit 300 of the new system is placed facing to the recording medium 200 of the old system as shown in FIG. 2, the shutter 221 of the cartridge 220 of the recording medium 200 of the old system is opened to advance the disk holding portion 310 of the driving unit 300 of the new system and the pickup 320 as shown in FIG. 6.

Then, as shown in FIGS. 6 and 7, at a point of time when the table surface 311a of the spindle table 311 is abutted onto the recording layer 213 side of the recording disk 210, the outer peripheral surface 312a of the first centering member 312 and the center hole 212 formed in the recording disk 210 are coupled each other, whereby the recording medium 200 of the old system is positioned with respect to the driving unit 300 of the new system. That is, in the recording medium 200 of the old system, the centering with respect to the driving unit 300 of the new system is executed by the recording disk 210.

In this state, the recording disk 210 is pushed by the disk holding portion 310 to move in the cartridge 220 in its thickness direction, and abuts onto the center hub 230 held by a hub holding portion 226. The tip end portion 313a of the second centering member 313 of the disk holding portion 310 is inserted into the center hole 231 of the center hub 230. However, since this center hub 230 is not integrated with the recording disk 210, and can be moved in its diameter direction, there are no effects on the positioning of the recording disk 210.

Additionally, a magnetic plate 232 is incorporated in the center hub 230. This magnetic plate 232 is adsorbed on the yoke 327 and the spindle table 311 magnetized by the magnet 316 of the disk holding portion 310, whereby the center hub 230 presses the recording disk 210 to the spindle table 311 to lightly hold it.

Further, the tip end portion of the first centering member 312 of the disk holding portion 310 is housed in a relief recess portion 233 formed in the center hub 230, and it is possible to prevent from interfering with the center hub 230 so that careless pushing down of the first centering member 312 by the center hub 230 can be prevented.

In the driving unit 300 of the new system, the recording disk 210 of the recording medium 200 of the old system is driven by the spindle motor in the state of being positioned by the center hole 212, whereby recording/reproducing is executed in the recording layer 213 by the pickup 320.

Next, description will be made of a case where the driving unit of the old system is set responding to the recording medium 100 of the new system and the recording medium 200 of the old system.

Figure 8:
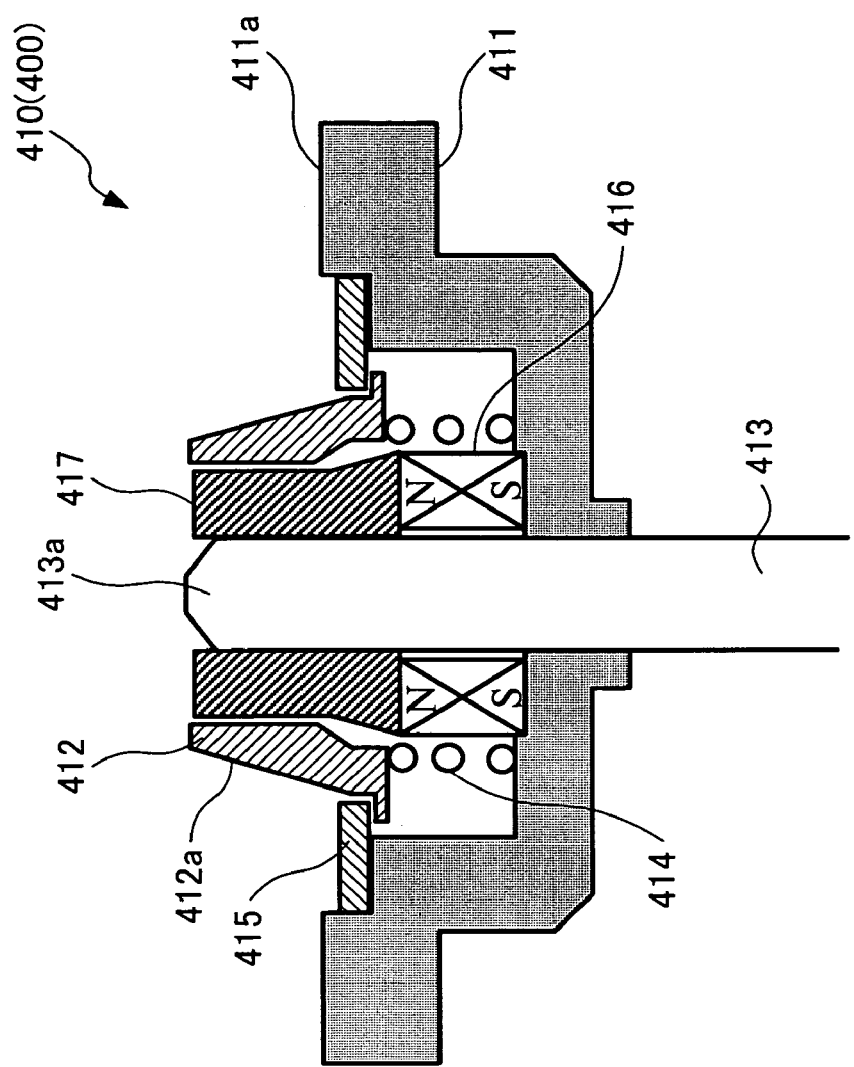
FIG. 8 is a sectional view showing a constitution of a disk holding portion in the driving unit of the old system.

A driving unit 400 of an old system shown in FIG. 8 is similar to the driving unit 10 shown in FIG. 12 in the constitution thereof. This driving unit 400 of the old system has only one centering member 412, a disk holding portion 410, and a not-shown pickup.

The disk holding portion 410 has a spindle table 411 having a table surface 411a similar to that of the spindle table 311 shown in FIG. 3, a centering member (fixing member) 412 having a tapered outer peripheral surface 412a as in the case of the first centering member 312, an elastic member 414 such as a coil spring, a stopper 415 for regulating the movement of the centering member 412, a magnet 416, and a yoke 417, and further has a constitution where a motor shaft 413 of a spindle motor for rotary-driving the recording medium penetrates the spindle table 411, the magnet 416, and the yoke 417.

A difference between the disk holding portion 410 of the driving unit 400 of the old system and the disk holding portion 310 of the driving unit 300 of the new system shown in FIG. 3 is that in the driving unit 300 of the new system, the second centering member 313 protrudes upward more than the first centering member 312, and the first centering member 312 slides to relatively protrude against the second centering member 313, while in the driving unit 400 of the old system shown in FIG. 8, though the motor shaft 413 of the spindle motor penetrates the spindle table 411, the magnet 416, and the yoke 417 (penetration is not always necessary), the motor shaft 413 of the spindle motor has no centering functions of the recording disks 110, 210, and thus its tip end portion 413a does not protrude more than the centering member 412 (protrusion is not necessary).

Figure 9:
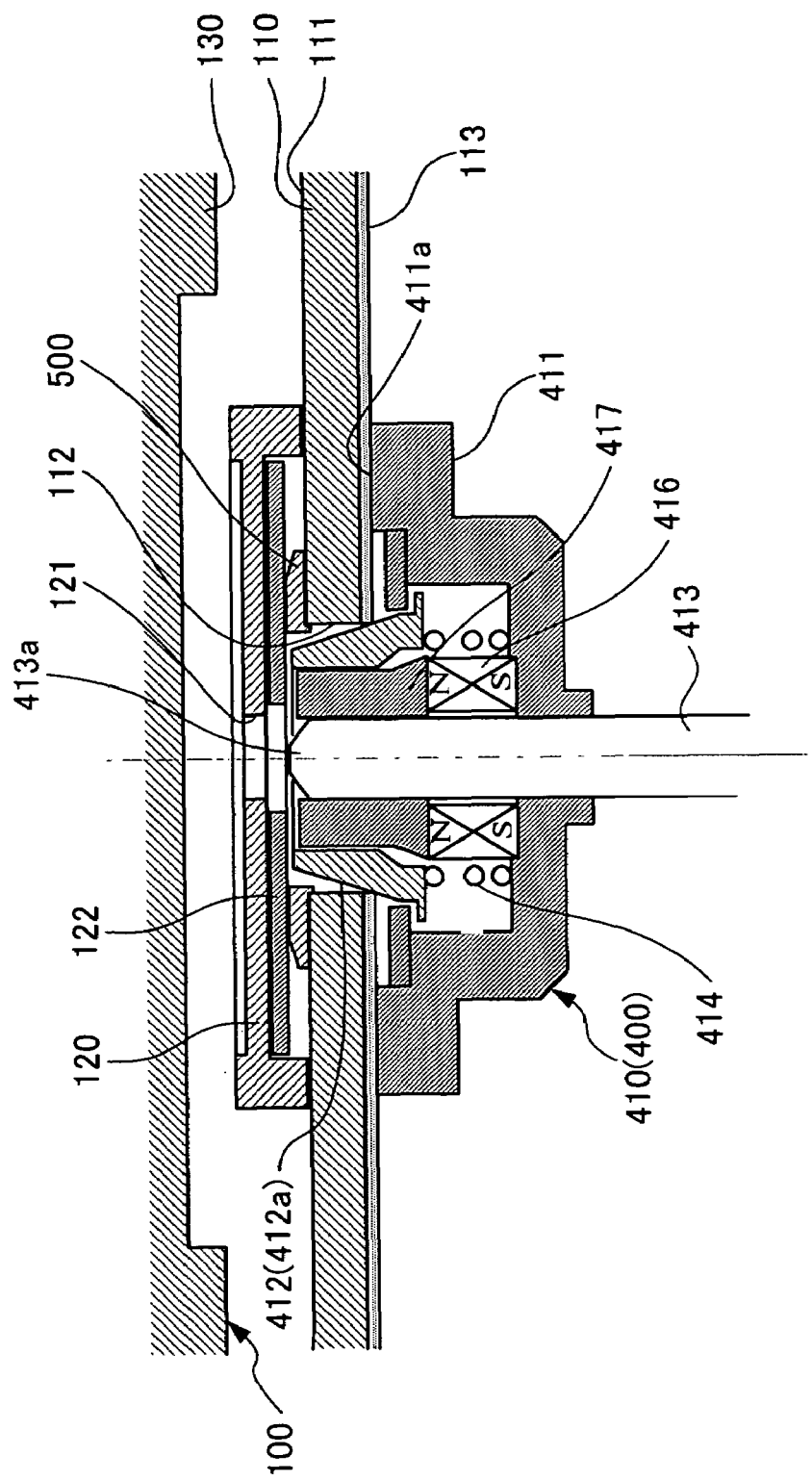
FIG. 9 is a sectional view showing a state where the recording medium of the new system is loaded on the driving unit of the old system.

FIG. 9 shows an example where the recording medium 100 of the new system is combined with the driving unit 400 of the old system. As shown in FIG. 9, in the opened state of the shutter 131 (see FIG. 1) of the recording medium 100 of the new system, the disk holding portion 410 of the driving unit 400 of the old system is advanced to abut the table surface 411a of the spindle table 411 onto the recording layer 113 side of the recording disk 110. In this state, the tapered outer peripheral surface 412a of the centering member 412 is coupled into the center hole 112 formed in the recording disk 110, whereby the recording disk 110 is positioned with respect to the driving unit 400 of the old system. That is, in the recording medium 100 of the new system, the centering with respect to the driving unit 400 of the old system is executed by the recording disk 110.

However, in this case, in the recording medium 100 of the new system, since the magnetic plate 122 has a loosely coupling structure with respect to the center hub 120, when the magnetic plate 122 adsorbed on the yoke 417 and the spindle table 411 magnetized by the magnet 416 pushes down the centering member 412, a gap is generated between the outer peripheral surface 412a of the centering member 412 and the inner peripheral surface of the center hole 112 of the recording disk 110 to make it impossible in some cases to execute the positioning of the recording disk 110. Thus, as shown in FIG. 9, preferably, a spacer 500 is disposed between the recording disk 110 and the magnetic plate 122 to regulate the movement of the magnetic plate 122, whereby unnecessary pushing down of the centering member 412 is prevented.

Figure 10:
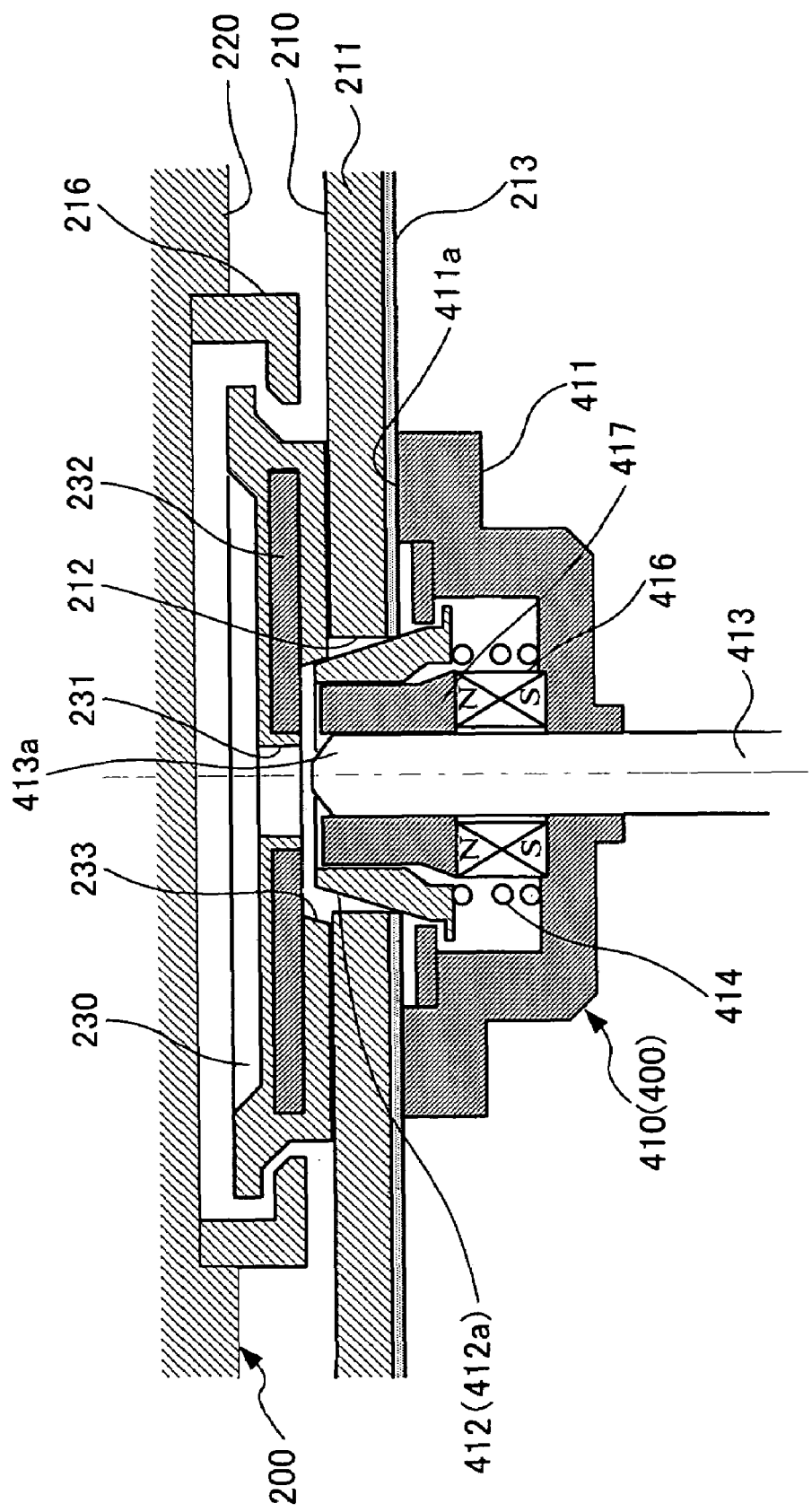
FIG. 10 is a sectional view showing a state where the recording medium of the old system is loaded on the driving unit of the old system.

FIG. 10 shows an example where the recording medium 200 of the old system with the additional features shown in FIG. 2 is combined with the driving unit 400 of the old system.

In the opened state of the shutter 221 (see FIG. 2) of the recording medium 200 of the old system, the disk holding portion 410 of the driving unit 400 of the old system is advanced to abut the table surface 411a of the spindle table 411 onto the recording layer 213 side of the recording disk 210. Then, in this state, the tapered outer peripheral surface 412a of the centering member 412 is coupled into the center hole 212 formed in the recording disk 210, whereby the recording medium 200 of the old system is positioned with respect to the driving unit 400 of the old system. That is, in the recording medium 200 of the old system, the centering with respect to the driving unit 400 of the old system is executed by the recording disk 210.

At this time, a magnetic plate 232 is adsorbed on the yoke 417 and the spindle table 411 magnetized by the magnet 416 of the disk holding portion 410, whereby the center hub 230 provided in the cartridge 220 side presses the recording disk 210 to the table surface 411a of the disk holding portion 410, and tightly holds it. In this case, a relief recess portion 233 is formed in the center hub 230 to prevent interference with the centering member 412, whereby careless pushing down of the centering member 412 is prevented.

As described above, the recording medium 100 of the new system has the center hole 112 formed in the recording disk 110, and the center hole 121 formed in the center hub 120, and it can be applied to both of the driving unit 400 of the old system having the tapered centering member 412 coupled into the center hole 112, and the driving unit 300 of the new system for inserting the responding second centering member 313 into the center hole 121 to execute positioning. When the recording medium 100 is loaded on the driving unit 300 of the new system, positioning is executed by the small-diameter center hole 121 formed in the center hub 120, whereby still highly accurate positioning can be surely executed.

The recording medium 200 of the old system has the recording disk 210 incorporated in the cartridge 220 having the center hub 230. For the driving unit 300 of the new system having the protruding second centering member 313, the second centering member 313 is coupled into the center hole 232 of the center hub 230 not integrated with the recording disk 210. However, actual positioning is executed by coupling the first centering member 312 into the center hole 212 of the recording disk 210. Accordingly, even when the recording disk 210 is a conventional recording medium such as a CD, this disk is incorporated in the cartridge 220 to be applicable to the driving unit 300 of the new system.

Moreover, in the recording medium 200 of the old system incorporated in such a cartridge 220, as in the conventional case, with respect to the disk holding portion 410 of the driving unit 400 of the old system in which the motor shaft 413 of the spindle motor does not protrude, positioning can be executed by coupling the centering member 412 into the center hole 212 of the recording disk 210. In this case, the center hub 230 provided in the cartridge 220 side is prevented from interfering with the centering to have no effect.

Thus, the recording medium 200 of the old system is applicable to both of the driving unit 300 of the new system, and the driving unit 400 of the old system.

On the other hand, seen from the driving unit 300 of the new system, with respect to the recording medium 100 of the new system, positioning can be executed by using the small-diameter second centering member 313 to couple into the center hole 121 formed in the center hub 120. With respect to the recording medium 200 of the old system, positioning can be executed by coupling the large-diameter first centering member 312 into the center hole 212 of the recording disk 210. That is, the driving unit 300 of the new system is applicable to both of the recording medium 100 of the new system and the recording medium 200 of the old system.

Additionally, the driving unit 400 of the old system can position even the recording medium 100 of the new system having the integrally formed center hub 120 by coupling the centering member 412 into the center hole 112 formed in the recording disk 110. Also, the recording medium 200 of the old system incorporated in the cartridge 220 provided with the center hub 230 can be similarly positioned by coupling the centering member 412 into the center hole 212 formed in the recording disk 210. That is, the driving unit 400 of the old system is applicable to both of the recording medium 100 of the new system and the recording medium 200 of the old system.

Thus, the recording medium 100 of the new system, the recording medium 200 of the old system, the driving unit 300 of the new system, and the driving unit 400 of the old system can be used by totally four combinations to achieve a so-called compatible Constitution having high Compatibility. Accordingly, whether the driving unit 300 of the new system or the driving unit 400 of the old system is used, the user can execute recording/reproducing in the recording medium 100 of the new system and the recording medium 200 of the old system. Therefore, a system configuration of high compatibility is provided to enable the user to receive high convenience.

Incidentally, in the above embodiment, in the recording medium 100 of the new system shown in FIG. 1, the magnetic plate 122 has the loosely coupling structure inside the center hub 120. However, it is not always necessary to provide the loosely coupling structure.

Figure 11:
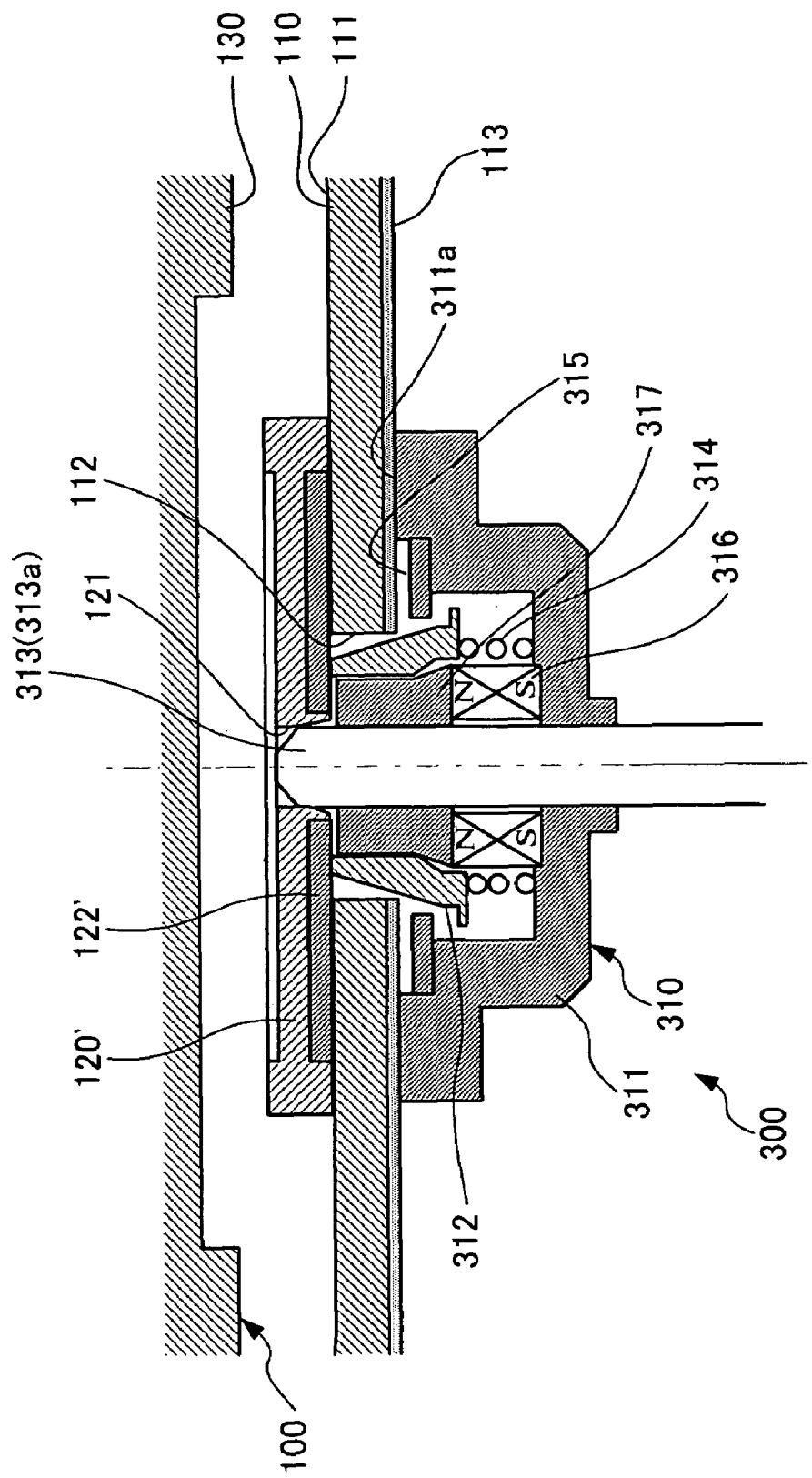
FIG. 11 is a sectional view showing a state where the recording medium of the new system is loaded on the driving unit of the new system according to a modified example of the embodiment.

As shown in FIG. 11, if a size of each portion is set so that the table surface 311a of the spindle table 311 is abutted onto the recording disk 110 and, in the pushed down state of the first centering member 312, the second centering member 313 is surely inserted into the center hole 121 of the center hub 120' to position the recording disk 110, a constitution where the magnetic plate 122' is integrated with the center hub 120' is possible.

Additionally, in the above embodiment, the cartridges 130, 220 are provided with the shutters 131, 221 only on one surface. However, the present invention can be applied even when these shutters are disposed in both surfaces. That is, shutters which open/close are disposed in both surfaces of the cartridges 130, 220 and a recording disk having recording layers in both surfaces is incorporated in place of the recording disks 110, 210 having the recording layers 113, 213 in one surface.

Furthermore, the constitution of each of the recording medium 100 of the new system, the recording medium 200 of the old system, the driving unit 300 of the new system, and the driving unit 400 of the old system can be changed as far as occasion demands without departing from the points of the present invention.

What is claimed is:

1. A driving unit for executing recording/reproducing to a recording disk, comprising in a disk holding portion for holding the recording disk:
   a first centering member having a predetermined outer diameter;
   a second centering member having an outer diameter smaller than that of the first centering member; and
   a protrusion size changing mechanism for changing a protrusion size of the second centering member toward the recording disk with respect to the first centering member,
   wherein when the recording disk held by the disk holding portion has a center hole of a predetermined diameter formed in the center portion of the recording disk, and a centering hole formed in the hub fixed to the recording disk, the centering hole having a diameter smaller than that of the center hole, the disk holding portion centers the recording disk by coupling the second centering member into the centering hole,
   wherein:
   the second centering member is capable of having a portion thereof inserted into the recording disk;
   the protrusion size is the size of the portion of the second centering member that is inserted into the recording disk; and
   the protrusion size changing mechanism changes the size of the portion of the second centering member that is inserted into the recording disk by retreating the first centering member with respect to the second centering member.

2. A driving unit for executing recording/reproducing to a recording disk, comprising in a disk holding portion for holding the recording disk:
   a first centering member having a predetermined outer diameter;
   a second centering member having an outer diameter smaller than that of the first centering member; and
   a protrusion size changing mechanism for changing a protrusion size of the second centering member toward the recording disk with respect to the first centering member, wherein when the recording disk held by the disk holding portion has a center hole of a predetermined diameter formed in a center portion of the recording disk, and a hole formed in a hub provided to move with respect to the recording disk, the hole having a diameter smaller than that of the center hole, the disk holding portion centers the recording disk by coupling the first centering member into the center hole, wherein:

the second centering member is capable of having a portion thereof inserted into the recording disk;

the protrusion size is the size of the portion of the second centering member that is inserted into the recording disk; and the protrusion size changing mechanism changes the size of the portion of the second centering member that is inserted into the recording disk by retreating the first centering member with respect to the second centering member.

3. A driving unit for driving a cartridge type recording medium incorporating a recording disk in a cartridge, comprising:

a centering member coupled into a center hole of the recording disk to center the recording disk when the cartridge type recording medium incorporating the recording disk having the center hole formed in a center portion thereof, and a hub having a hole of a diameter smaller than that of the center hole is driven;

a table member having a table surface on which one surface side of the recording disk is abutted; and a protrusion size changing mechanism for changing a protrusion size toward the recording disk with respect to the centering member, wherein as the protrusion size changing mechanism, an elastic member is provided to retreat the centering member with respect to the recording disk, and return the centering member to an original position, the driving unit further comprising a protrusion member that is capable of protruding toward the recording disk, the protrusion size being a size of a portion of the protrusion member that is inserted into the center hole, wherein the size of the portion of the protrusion that is inserted into the center hole is controlled by the protrusion size changing mechanism via retreating the centering member with respect to the recording disk.

4. A driving unit according to claim 3, wherein the hub is held in the cartridge in a movable state in a diameter direction of the recording disk.

5. The driving unit according to claim 3, wherein the recording disk comprises a substrate having two major surfaces, a recording layer is formed on one of the two major surfaces, and the hub is formed on the other of the two major surfaces.

6. A driving unit capable of recording and/or reproducing to a first recording disk having a hole for centering and a second recording disk having a hole for centering, comprising in a disk holding portion for holding the first recording disk and the second recording disk:

a first centering member for centering the first recording disk having a predetermined outer diameter;

a second centering member for centering the second recording disk having an outer diameter thereof smaller than the first centering member; and a protrusion size changing mechanism for changing a protrusion size of the second centering member against the first centering member toward the second recording disk, wherein when the first recording disk held by the disk holding portion has a center hole of a predetermined diameter formed in a center portion of the first recording disk, and a hole formed in a hub provided to move with respect to the first recording disk, the hole having a diameter smaller than that of the center hole, the disk holding portion centers the first recording disk by coupling the first centering member into the center hole of the first recording disk, wherein when the second recording disk held by the disk holding portion has a center hole of a predetermined diameter formed in the center portion of the second recording disk, and a centering hole formed in the hub fixed to the second recording disk, the centering hole of the hub having a diameter smaller than that of the center hole of the second recording disk, the disk holding portion centers the second recording disk by coupling the second centering member into the centering hole of the hub, wherein as the protrusion size changing mechanism, an elastic member is provided to retreat the first centering member with respect to the second centering member, and return the first centering member to an original position, and wherein:

the second centering member is capable of having a portion thereof inserted into the second recording disk;

the protrusion size is the size of the portion of the second centering member that is inserted into the second recording disk; and the protrusion size changing mechanism changes the size of the portion of the second centering member that is inserted into the second recording disk by retreating the first centering member with respect to the second centering member.

* * * * *